UNITED STATES PATENT OFFICE.

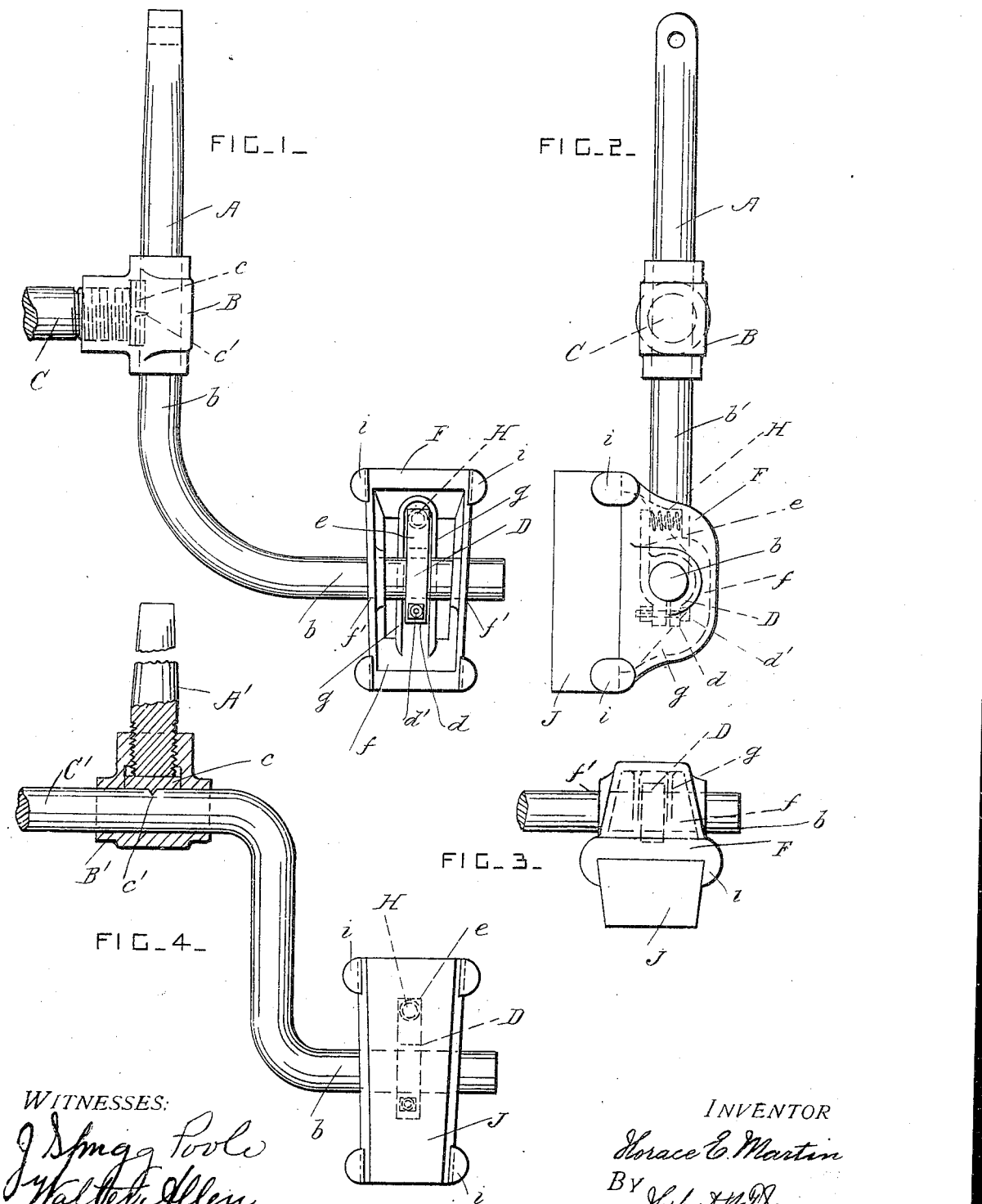

HORACE E. MARTIN, OF ATHENS, GEORGIA.

VEHICLE-BRAKE.

No. 822,750.  Specification of Letters Patent.  Patented June 5, 1906.

Application filed April 25, 1905. Serial No. 257,328.

*To all whom it may concern:*

Be it known that I, HORACE E. MARTIN, a citizen of the United States, residing at Athens, in the county of Clarke and State of Georgia, have invented certain new and useful Improvements in Vehicle-Brakes; and I do hereby declare the following to be a full, clear, and exact description of the invention, such as will enable others skilled in the art to which it appertains to make and use the same.

This invention relates to pivoted brakes for use in connection with the wheels of vehicles; and it consists in the novel construction and combination of the parts hereinafter fully described and claimed.

In the drawings, Figure 1 is a front view of the brake with a brake-block removed. Fig. 2 is a side view of the brake. Fig. 3 is an end view of the brake shoe and block. Fig. 4 is a front view of the brake, showing a modification.

A is the brake-lever, which has an end portion $b$ arranged at a right angle to its main portion.

B is a socket, which is adjustable longitudinally upon the main portion $b'$, which is cylindrical. C is the end portion of a pivot or pivot-shaft, which is screwed into a hole in the said socket at a right angle to the main portion $b'$ of the brake-lever. A small shoe $c$ is arranged in the socket B in the space between the lever and the end of the pivot, and this shoe is provided with one or more sharp points or knife-edges $c'$. When the pivot is screwed up tightly, these points or projections are pressed into the metal of the lever A, so that the pivot and the socket are rigidly secured to the said lever and cannot slip.

D is a spring split collar, which is adjustable upon the end portion $b$ of the brake-lever and which is provided with lugs $d$ and a screw or bolt $d'$ for clamping it in any desired position upon the said end portion. This collar has also a projecting arm $e$.

F is a shoe or carrier provided with a chamber $f$, in which the split collar is arranged. The shoe F has also holes $f'$, in which the cylindrical end portion $b$ is slidable. The chamber $f$ is provided with projecting ribs $g$, which engage with the collar and prevent the shoe from sliding laterally.

H is a small spiral spring arranged between the arm $e$ and one of the walls of the chamber $f$. This spring holds the shoe in a prearranged position upon the part $b$ and permits it to rock to a limited extent upon the said part.

J is a brake-block of wood of other suitable material, which is secured to the shoe or carrier F in any approved manner. The brake-block J is preferably wedge-shaped, and the shoe is also wedge-shaped and is provided with dovetailed lugs $i$ at its ends which engage with the dovetailed sides of the wedge-shaped brake-block and hold it securely in position.

The movable socket B permits the fulcrum of the brake-lever to be changed and adjusted as required, and the construction of the brake-shoe permits the brake-block to bear uniformly against the wheel and to adapt itself to the wear of the brake-block.

In the modification shown in Fig. 4 a socket B', similar to the socket B, is used for connecting one portion A' of the brake-lever with the pivot-shaft C' of the brake. In this form of the brake an adjustable shoe F is provided the same as hereinbefore described.

The socket B' and handle A' of Fig. 4 can be secured on the pivot-shaft C of Fig. 1, if desired, so that both sockets are used in a single brake mechanism.

What I claim is—

1. The combination, with a brake-lever having a laterally-projecting end portion, and a brake-block carried by the said end portion; of a pivot for the said lever, and a socket adjustable longitudinally upon the middle part of the said brake-lever and connecting it to its said pivot.

2. The combination, with a brake-lever provided with a brake-block, of a pivot-socket slidable on the said lever, and a pivot for the said lever screwed into the said socket and operating to clamp the said socket to the said lever.

3. The combination, with a brake-lever provided with a brake-block, of a pivot-socket slidable on the said lever, a pivot for the said lever screwed into the said socket, and a shoe interposed between the end of the said pivot and the lever and provided with a projection which engages with the said lever when the pivot is screwed up tightly.

4. The combination, with a brake-operating lever, and a pivot therefor; of a T-shaped socket for adjustably connecting the two said parts, one of the said parts being normally slidable in the main portion of the said socket, and the other said part being screwed into the branch portion of the said socket and operating to clamp the first said part in the said main portion.

In testimony whereof I have affixed my signature in the presence of two witnesses.

HORACE E. MARTIN.

Witnesses:
 FRANK HARGROVE,
 M. B. JACKSON.